United States Patent
Hong et al.

(10) Patent No.: US 12,443,203 B2
(45) Date of Patent: Oct. 14, 2025

(54) ROBOT AND CONTROLLING METHOD OF ROBOT

(71) Applicant: SAMSUNG ELECTRONICS CO., LTD., Suwon-si (KR)

(72) Inventors: Hyunki Hong, Suwon-si (KR); Youngil Koh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 38 days.

(21) Appl. No.: 18/400,817

(22) Filed: Dec. 29, 2023

(65) Prior Publication Data
US 2024/0134391 A1    Apr. 25, 2024
US 2024/0231384 A9    Jul. 11, 2024

Related U.S. Application Data

(63) Continuation of application No. PCT/KR2023/007758, filed on Jun. 7, 2023.

(30) Foreign Application Priority Data

Aug. 26, 2022    (KR) ........................ 10-2022-0107944

(51) Int. Cl.
     *G05D 1/646*      (2024.01)
     *G05D 1/243*      (2024.01)

(52) U.S. Cl.
     CPC .............. *G05D 1/646* (2024.01); *G05D 1/243* (2024.01)

(58) Field of Classification Search
     CPC ................................ G05D 1/646; G05D 1/243
(Continued)

(56) References Cited

U.S. PATENT DOCUMENTS 9,868,210 B1    1/2018    Whitman
10,286,558 B1    5/2019    Asada et al.
(Continued)

FOREIGN PATENT DOCUMENTS

CN    113341983 A    9/2021
CN    113651221 A    11/2021
(Continued)

OTHER PUBLICATIONS

International Search Report (PCT/ISA/210) issued on Sep. 20, 2023 by the International Searching Authority in International Patent Application No. PCT/KR2023/007758.
(Continued)

*Primary Examiner* — Mahmoud S Ismail
(74) *Attorney, Agent, or Firm* — Sughrue Mion, PLLC

(57) ABSTRACT

A robot includes: a plurality of wheels; a plurality of motors; at least one sensor; a memory configured to store first information on a size of the robot; and a processor. The processor is configured to: acquire image data of an escalator from the at least one sensor, acquire second information on a size of a plurality of steps included in the escalator based on the image data, based on the first information and the second information, identify both a boarding position available for the robot to board the escalator among the plurality of steps, and a posture of the robot configured to allow the robot to board at the boarding position, acquire control information for controlling the robot to board at the boarding position in the posture when the boarding position and the posture have been identified, and control the plurality of motors based on the control information.

20 Claims, 9 Drawing Sheets

(58) Field of Classification Search
USPC .......................................................... 701/28
See application file for complete search history.

(56) References Cited

U.S. PATENT DOCUMENTS

| | | | |
|---|---|---|---|
| 10,576,617 B1* | 3/2020 | Asada | ................... B25J 11/008 |
| 11,269,328 B2 | 3/2022 | Kim et al. | |
| 11,314,263 B2 | 4/2022 | Moon et al. | |
| 2018/0210448 A1* | 7/2018 | Lee | ...................... G05D 1/0214 |
| 2020/0031245 A1* | 1/2020 | Browning | ............... B60L 53/36 |
| 2021/0166416 A1* | 6/2021 | Hu | ........................... G06T 7/12 |
| 2021/0299873 A1 | 9/2021 | Badiozamani et al. | |
| 2023/0415343 A1* | 12/2023 | Whitman | ............... B25J 9/1697 |

FOREIGN PATENT DOCUMENTS

| | | |
|---|---|---|
| CN | 113733116 A | 12/2021 |
| EP | 4 032 846 A1 | 7/2022 |
| EP | 4 331 777 A1 | 3/2024 |
| JP | 2012-115311 A | 6/2012 |
| KR | 10-2011-0099202 A | 9/2011 |
| KR | 10-2018-0108144 A | 10/2018 |
| KR | 10-2019-0086628 A | 7/2019 |
| KR | 10-2012548 B1 | 8/2019 |
| KR | 10-2314372 B1 | 10/2021 |
| KR | 10-2022-0102343 A | 7/2022 |
| WO | 2022/029971 A1 | 2/2022 |

OTHER PUBLICATIONS

Written Opinion (PCT/ISA/237) issued on Sep. 20, 2023 by the International Searching Authority in International Patent Application No. PCT/KR2023/007758.
Communication issued on Jul. 10, 2025 by the European Patent Office in European Patent Application No. 23857500.5.

* cited by examiner

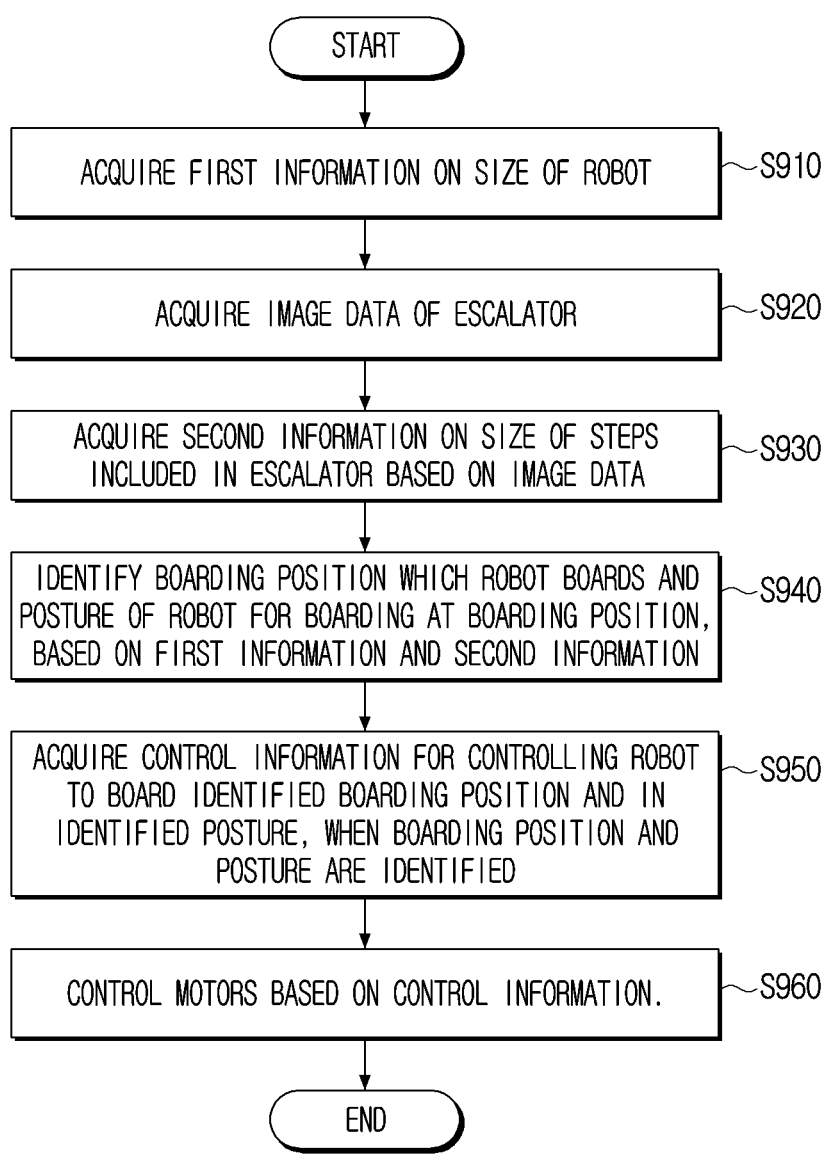

ROBOT AND CONTROLLING METHOD OF ROBOT

CROSS-REFERENCE TO RELATED APPLICATION(S)

This application is a by-pass continuation application of International Application No. PCT/KR2023/007758, filed on Jun. 7, 2023, which is based on and claims priority to Korean Patent Application No. 10-2022-0107944, filed on Aug. 26, 2022, in the Korean Intellectual Property Office, the disclosures of which are incorporated by reference herein in their entireties.

TECHNICAL FIELD

The disclosure relates to a robot and a controlling method of the robot, and more particularly, to a robot capable of stably boarding or unboarding an escalator and a controlling method of the robot.

BACKGROUND

In recent years, the development of technology for robots has been accelerated. In particular, recently, various types of robots, such as cleaning robots, service robots, and industrial robots have been used in real life, and to increase the possibility of using these robots, it is important for the robots to efficiently move to a destination to perform a mission.

However, there may be cases in which a robot needs to move between floors when moving to a destination, and in these cases, it may be desirable that the robot moves between floors using steps, an elevator, or an escalator. However, inter-floor movement through steps may only be applicable for robots with a form factor enabling inter-floor movement through steps.

Although moving between floors through an elevator may be one option, a travel time to the destination may increase by a time required for moving to the elevator and a time waiting for the arrival of the elevator, and in a situation in which the robot should get in with a large number of people in a limited internal space of the elevator, the robot may be restricted from boarding the elevator or may cause inconvenience to a large number of people if ever.

Therefore, moving between floors through an escalator may be a method for improving driving efficiency. However, when a robot boards or unboards the escalator, problems with boardability and stability may occur. Specifically, if a width of the robot or a distance between left and right wheels of the robot is shorter than a width of escalator steps, the robot may be restricted from boarding the escalator. In addition, even when the robot may board the escalator, if the center of gravity of the robot is at a position where torque is generated downwardly, the robot may fall off the escalator when the escalator ascends or descends.

SUMMARY

The disclosure relates to a robot capable of stably boarding and unboarding an escalator, and a controlling method of the robot.

A robot may include: a plurality of wheels; a plurality of motors configured to drive the plurality of wheels; at least one sensor; a memory configured to store first information on a size of the robot; and a processor. The processor may be configured to: acquire image data of an escalator from the at least one sensor, acquire second information on a size of a plurality of steps included in the escalator based on the image data, based on the first information and the second information, identify both a boarding position available for the robot to board the escalator among the plurality of steps, and a posture of the robot configured to allow the robot to board at the boarding position, acquire control information for controlling the robot to board at the boarding position in the posture when the boarding position and the posture have been identified, and control the plurality of motors based on the control information.

The first information may include information on a first length corresponding to a first width of the robot, information on a second length corresponding to a second width of the robot, and information on height adjustment of the plurality of wheels, the second length being shorter than the first length.

The second information may include information on a horizontal length of each of the plurality of steps that is perpendicular to a non-elevating component of a moving direction of the plurality of steps, information on a vertical length of each of the plurality of steps that is parallel to the non-elevating component of the moving direction, and information on a height of the plurality of steps, the horizontal length being longer than at least one of the first length or the second length, the vertical length being shorter than the horizontal length. The information on the height of the plurality of steps may include information on a height difference between adjacent steps of the plurality steps and information on a change rate of the height difference.

The processor may be further configured to identify a first position on a first step of the plurality of steps as the boarding position when at least one of the first length or the second length is shorter than the vertical length.

When the first length is shorter than the vertical length, the processor may be configured to control the plurality of motors so that the robot boards the first position in the posture such that the first length is parallel to the vertical length. When the first length is longer than the vertical length and the second length is shorter than the vertical length, the processor may be configured to control the plurality of motors so that the robot boards the first position in the posture such that the first length is parallel to the horizontal length.

When the first length and the second length are longer than the vertical length, the processor may be configured to identify, as the boarding position, a second position overlapping between a first step of the plurality of steps and a second step of the plurality of steps, the second step being adjacent to the first step.

When the first length is longer than the vertical length but shorter than twice the vertical length, the processor may be configured to: control the plurality of motors so that the robot boards the second position in the posture such that the first length is parallel to the vertical length, and control the plurality of motors so that a height difference between the plurality of wheels corresponds to the height difference between the first step and the second step while the height difference between the first step and the second step changes.

When the first length is longer than twice the vertical length, the second length is longer than the vertical length, and the second length is shorter than twice the vertical length, the processor may be configured to: control the plurality of motors so that the robot boards the second position in the posture such that the first length is parallel to the horizontal length, and control the plurality of motors so that a height difference between the plurality of wheels corresponds to the height difference between the first step and the second step while the height difference between the first step and the second step changes.

The at least one sensor may include a balance sensor. The processor may be further configured to: acquire a sensing value indicating whether the robot is balanced through the balance sensor, and control the plurality of motors so that the height difference between the plurality of wheels corresponds to the height difference between the first step and the second step based on the sensing value.

The processor may be further configured to: acquire information on an object near the escalator through the at least one sensor, and identify both the boarding position and a movement path based on the first information, the second information, and the information on the object, the movement path being from a current position of the robot to the boarding position.

A controlling method of a robot that includes a plurality of wheels, a plurality of motors for driving the plurality of wheels, and at least one sensor, may include: acquiring first information on a size of the robot; acquiring image data of an escalator from the at least one sensor; acquiring second information on a size of a plurality of steps included in the escalator based on the image data; based on the first information and the second information, identifying both a boarding position available for the robot to board the escalator among the plurality of steps and a posture of the robot configured to allow the robot to board at the boarding position; acquiring control information for controlling the robot to board at the boarding position and in the posture, when the boarding position and the posture have been identified; and controlling the plurality of motors based on the control information.

The first information may include information on a first length corresponding to a first width of the robot, information on a second length corresponding to a second width of the robot, and information on height adjustment of the plurality of wheels, the second length being shorter than the first length.

The second information may include information on a horizontal length of each of the plurality of steps that is perpendicular to a non-elevating component of a moving direction of the plurality of steps, information on a vertical length of each of the plurality of steps that is parallel to the non-elevating component of the moving direction, and information on a height of the plurality of steps, the horizontal length being longer than at least one of the first length or the second length, the vertical length being shorter than the horizontal length. The information on the height of the plurality of steps may include information on a height difference between adjacent steps of the plurality steps and information on a change rate of the height difference.

The identifying the boarding position may include identifying a first position on a first step of the plurality of steps as the boarding position when at least one of the first length or the second length is shorter than the vertical length.

The controlling the plurality of motors based on the control information may include: when the first length is shorter than the vertical length, controlling the plurality of motors so that the robot boards the first position in the posture such that to the first length is parallel to the vertical length, and when the first length is longer than the vertical length and the second length is shorter than the vertical length, controlling the plurality of motors so that the robot boards the first position in the posture such that the first length is parallel to the horizontal length.

The identifying the boarding position may include identifying, as the boarding position, a second position overlapping between a first step of the plurality of steps and a second step of the plurality of steps when the first length and the second length are longer than the vertical length, the second step being adjacent to the first step.

The controlling the plurality of motors based on the control information may include, when the first length is longer than the vertical length but shorter than twice the vertical length: controlling the plurality of motors so that the robot boards the second position in the posture such that the first length is parallel to the vertical length, and controlling the plurality of motors so that a height difference between the plurality of wheels corresponds to the height difference between the first step and the second step while the height difference between the first step and the second step changes.

The controlling the plurality of motors based on the control information may include, when the first length is longer than twice the vertical length, the second length is longer than the vertical length, and the second length is shorter than twice the vertical length: controlling the plurality of motors so that the robot boards the second position in the posture such that the first length is parallel to the horizontal length, and controlling the plurality of motors so that a height difference between the plurality of wheels corresponds to the height difference between the first step and the second step while the height difference between the first step and the second step changes.

The at least one sensor may include a balance sensor. The controlling the plurality of motors based on the control information may further include: acquiring a sensing value indicating whether the robot is balanced through the balance sensor, and controlling the plurality of motors so that the height difference between the plurality of wheels corresponds to the height difference between the first step and the second step based on the sensing value.

The controlling method may further include: acquiring information on an object near the escalator through the at least one sensor, and identifying both the boarding position and a movement path based on the first information, the second information, and the information on the object, the movement path being from a current position of the robot to the boarding position.

A non-transitory computer readable recording medium may include a program for executing a control method of a robot that includes a plurality of wheels, a plurality of motors for driving the plurality of wheels, and at least one sensor. The control method may include: acquiring first information on a size of the robot; acquiring image data of an escalator from the at least one sensor; acquiring second information on a size of a plurality of steps included in the escalator based on the image data; based on the first information and the second information, identifying both a boarding position available for the robot to board the escalator among the plurality of steps and a posture of the robot configured to allow the robot to board at the boarding position; acquiring control information for controlling the robot to board at the boarding position and in the posture, when the boarding position and the posture have been identified; and controlling the plurality of motors based on the control information.

BRIEF DESCRIPTION OF THE DRAWINGS

The above and/or other aspects of the disclosure will be more apparent by describing certain embodiments of the disclosure with reference to the accompanying drawings, in which:

FIG. 9 is a flowchart illustrating a method for controlling a robot according to one or more embodiments of the disclosure.

DETAILED DESCRIPTION

Figure 1:
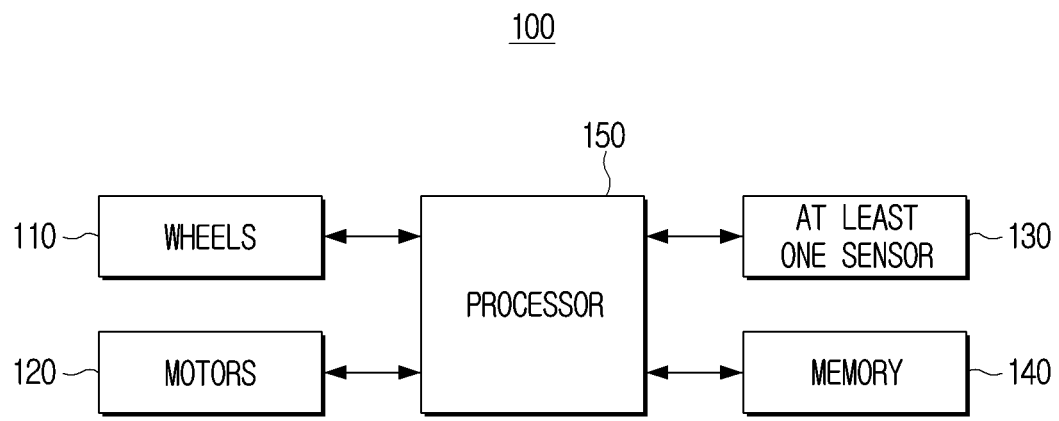
FIG. 1 is a diagram briefly illustrating a configuration of a robot according to one or more embodiments of the disclosure.

Hereinafter, various embodiments of the disclosure are described with reference to the accompanying drawings. However, it should be appreciated that the disclosure is not limited to a specific embodiment and all modifications, equivalents and/or alternatives thereof also belong to the scope of the disclosure. The same reference numbers are used throughout the drawings to refer to the same or like parts.

In describing the disclosure, if a detailed description for a related known function or construction is considered to unnecessarily divert the gist of the disclosure, such explanation has been omitted but would be understood by those skilled in the art.

The disclosure may be embodied in many different forms and should not be construed as being limited to the embodiments set forth herein; rather, these embodiments are provided so that this disclosure will be thorough and complete, and will fully convey the concept of the disclosure to those of ordinary skill in the art.

Terms used in the present specification are used only in order to describe specific exemplary embodiments rather than limiting the disclosure. Singular forms are intended to include plural forms unless the context clearly indicates otherwise.

In the disclosure disclosed herein, the expressions "have", "may have", "include" and "comprise", or "may include" and "may comprise" used herein indicate existence of corresponding features (e.g., elements, such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

Expressions such as "first," "second," "primarily," or "secondary," used herein may represent various elements regardless of order and/or importance and do not limit corresponding elements.

When it is described that an element (such as a first element) is "operatively or communicatively coupled with/to" or "connected" to another element (such as a second element), the element may be directly connected to the other element or may be connected to the other element through another element (e.g., a third element).

However, when it is described that an element (such as a first element) is "directly connected" or "directly coupled" to another element (such as a second element), it means that there is no intermediate element (such as a third element) between the element and the other element An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware.

Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

In the description, the word "module" or "part" refers to a software component, a hardware component, or a combination thereof, which is capable of carrying out at least one function or operation. A plurality of modules or parts may be integrated into at least one module and implemented using at least one processor except for those modules or parts that need to be implemented in specific hardware.

Various elements and regions in the drawings are schematically drawn. Therefore, the technical concept of the disclosure is not limited by a relative size or spacing drawn in the accompanying drawings.

Embodiments of the disclosure will now be described more fully hereinafter with reference to the accompanying drawings so that they may be easily implemented by one of ordinary skill in the art.

Figure 2:
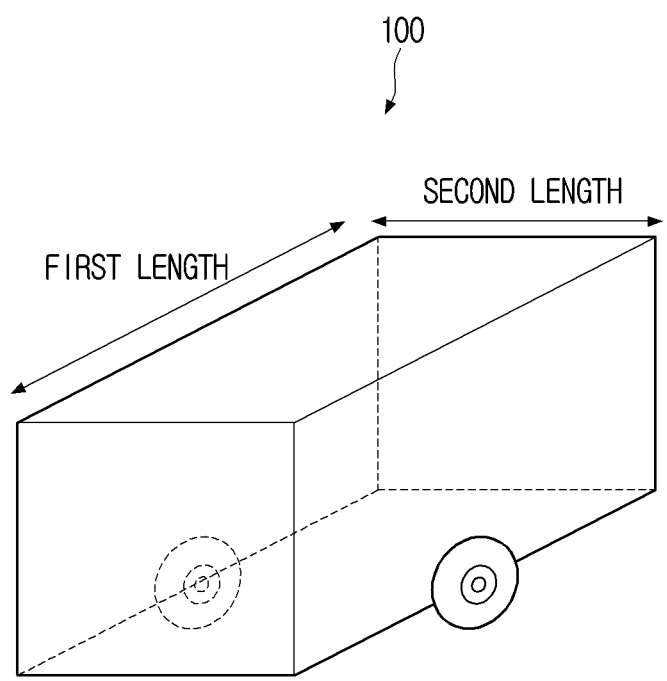
FIG. 2 is a diagram illustrating a shape of a robot according to one or more embodiments of the disclosure.
Figure 3:
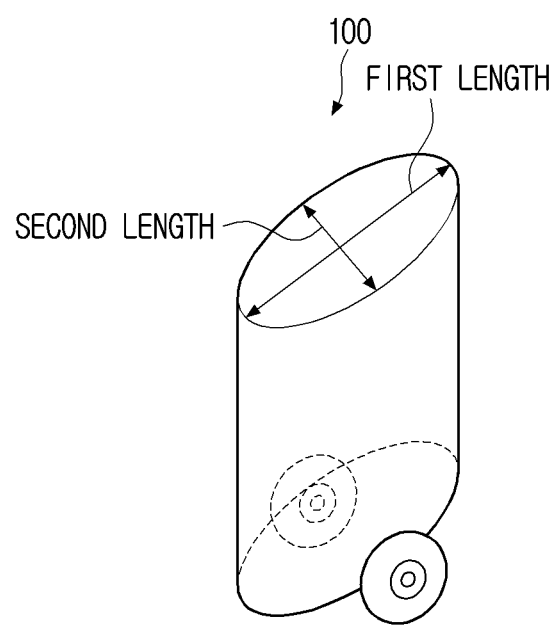
FIG. 3 is a diagram illustrating a shape of a robot according to one or more embodiments of the disclosure.

FIG. 1 is a diagram briefly illustrating the configuration of a robot 100 according to one or more embodiments of the disclosure. Also, FIG. 2 is a diagram illustrating a shape of the robot 100 according to one or more embodiments of the disclosure, and FIG. 3 is a diagram illustrating a shape of the robot 100 according to one or more embodiments of the disclosure.

The robot 100 may be a device capable of moving to a destination. For example, the robot 100 may be a service robot 100, such as a guide robot 100, a cleaning robot 100, a retail service robot 100, etc., and may also be a manufacturing robot 100 to perform work at a manufacturing site of a product. In addition, any device capable of moving to a destination may correspond to the robot 100.

As shown in FIG. 1, the robot 100 may include a plurality of wheels 110, a plurality of motors 120, at least one sensor 130, a memory 140, and a processor 150.

The plurality of wheels 110 may move the robot 100 to a destination. In particular, the plurality of wheels 110 may move the robot 100 from a current position to a boarding position of the escalator (i.e., a position in which the robot boards the escalator). For example, the robot 100 may include two wheels disposed on both left and right sides of a lower end of a body of the robot 100, and may include four wheels of which twos are respectively disposed on both left and right sides of the lower end of the body of the robot 100. The robot 100 may include a plurality of wheels 110, but some embodiments may be implemented even when the robot 100 includes one wheel.

The plurality of wheels 110 may be implemented to be adjustable in height. Specifically, the plurality of wheels 110 may be connected to the body of the robot 100 through a height adjustment frame, and as a coupling distance between the plurality of wheels 110 and the height adjustment frame changes, a distance between the plurality of wheels 110 and the body of the robot 100 may be adjusted. Of course, various other techniques for adjusting the height may be applied.

The plurality of motors 120 may drive the plurality of wheels 110. Specifically, some of the plurality of motors 120 may be connected to a wheel through an axle, so that power generated by the plurality of motors 120 may be transferred to the wheel and the wheel may roll. When the height of the plurality of wheels 110 is implemented to be adjustable, some of the plurality of motors 120 change the coupling distance between the plurality of wheels 110 and the height adjustment frame to change a distance between the plurality of wheels 110 and the body of the robot 100. In addition, the plurality of motors 120 may also be used to implement various movements of the robot 100.

At least one sensor 130 may acquire various data regarding the robot 100 or the escalator. Specifically, the at least one sensor 130 may include an optical sensor, a 3D distance sensor, a 2D distance sensor, a balance sensor, and the like. For example, the at least one sensor 130 may include a charge coupled device (CCD) image sensor, a complementary metal oxide semiconductor (CMOS) image sensor, a lidar sensor, an inertial measurement unit (IMU), a gyro sensor (or a gyroscope), an acceleration sensor (accelerometer), a global positioning system (GPS) sensor, a vision sensor, a motion sensor, and the like. In addition to the aforementioned examples, any sensor capable of acquiring data regarding the robot 100 or the escalator may be included in the sensor without limitation on the type thereof.

At least one instruction for the robot 100 may be stored in the memory 140. Also, an operating system (O/S) for driving the robot 100 may be stored in the memory 140. Also, various software programs or applications for operating the robot 100 may be stored in the memory 140. Also, the memory 140 may include a semiconductor memory, such as a flash memory, or a magnetic storage medium, such as a hard disk.

Specifically, various software modules for operating the robot 100 may be stored in the memory 140, and the processor 150 may control the operation of the robot 100 by executing various software modules stored in the memory 140. That is, the memory 140 is accessed by the processor 150, and data may be read/written/modified/deleted/updated by the processor 150.

The term of memory 140 may be used to refer to the memory 140, a ROM (not shown) in the processor 150, a RAM (not shown), or a memory card (not shown) mounted in the robot 100 (e.g., micro SD card, memory stick).

In particular, the memory 140 may store image data, first information, second information, information on a boarding position, information on a posture of the robot 100, and control information on the robot 100, and the like. In addition, various other information may be stored in the memory 140, and the information stored in the memory 140 may be received from an external device or input by a user to be updated.

The processor 150 controls the overall operation of the robot 100. Specifically, the processor 150 may be connected to the configuration of the robot 100 including the plurality of wheels 110, the plurality of motors 120, at least one sensor 130, and the memory 140, as described above, and may generally control the operation of the robot 100 by executing at least one instruction stored in the memory 140.

The processor 150 may be implemented in various manners. For example, the processor 150 may be implemented as at least one of an application specific integrated circuit (ASIC), an embedded processor, a microprocessor, hardware control logic, a hardware finite state machine (FSM), a digital signal processor (DSP). The term of the processor 150 may be used to include a central processing unit (CPU), a graphics processing unit (GPU), and a main processing unit (MPU).

In particular the processor 150 may control the robot 100 to stably board the escalator. Hereinafter, the meaning of the first information and the second information will be described first with reference to FIGS. 2 and 3, and then various embodiments according to the control of the processor 150 will be described.

The term "first information" is used as a generic term for information on a size of the robot 100. Specifically, the first information may include information on a first length, information on a second length, and information on height adjustment of the plurality of wheels 110. First, the information on the height adjustment of the plurality of wheels 110 may include information on whether the plurality of wheels 110 may be adjusted in height, information on a maximum value of height adjustment, and information on a maximum speed of height adjustment.

The first length refers to a length representing a first width of the robot 100, and the second length refers to a second width of the robot 100 and refers to a length shorter than the first length. That is, it is assumed that the first length is greater than the second length, which is only for clearly describing an example embodiment, however, the first length and the second length may be equal.

Referring to the example of FIG. 2, the robot 100 may include a rectangular parallelepiped body and two wheels. In this case, a length of the side having a maximum width in the body of the robot 100 may be determined as the first length, and a length of the side having a minimum width in the body of the robot 100 may be determined as the second length.

Referring to the example of FIG. 3, the robot 100 may include a body in the shape of an elliptical column and two wheels. In this case, a length of a major axis of the ellipse having a maximum width in the body of the robot 100 may be determined as the first length, and a length of a minor axis of the ellipse having a minimum width in the body of the robot 100 may be determined as the second length.

However, FIGS. 2 and 3 are merely examples, and the shape of the robot 100 and number of wheels may be implemented in various manners. In addition, components (e.g., a manipulators etc.) different from those shown in FIGS. 2 and 3 may be further added to the robot 100, and accordingly, the first length of the robot 100 and the second length of the robot 100 may be determined to be different from those shown in FIG. 2 or FIG. 3.

In FIGS. 2 and 3, a case in which, when two wheels rotate for the movement of the robot 100, rotating shafts, which are the centers of rotation, are parallel to the direction of the second length (i.e., a case in which a moving direction of the robot according to rotation of two wheels is parallel to the direction of the first length) is illustrated, but the embodiments are not limited thereto. That is, the rotating shafts of the two wheels may be implemented to be parallel to the direction of the first length, or may be implemented to be parallel to other directions. The rotating shafts refer to axes that are the centers of rotation of the plurality of wheels when the plurality of wheels rotate for the movement of the robot 100, and when the robot 100 is implemented as shown in FIGS. 2 and 3, the rotating shafts of the two wheels may be the same.

FIGS. 2 and 3 illustrate a case in which rotating shafts of the plurality of wheels 110 are fixed in a direction parallel to the direction of the second length, but the embodiments are not limited thereto. That is, the robot 100 may be implemented to rotate the body about an axis perpendicular to the ground in a state in which the plurality of wheels 110 are in contact with the ground, and in this case, the rotating shafts of the plurality of wheels 110 may rotate in a direction of 360 degrees based on an axis perpendicular to the ground.

The first information may be stored in the memory 140 by a developer when the robot 100 is manufactured or may be received from an external device and stored in the memory 140. Hereinafter, it is assumed that the first information is pre-stored in the memory 140.

The term "second information" is used as a generic term for information on the size of a plurality of steps included in the escalator. Specifically, the second information may include information on a horizontal length of the steps, information on a vertical length of the steps, and information on a height of the steps.

The horizontal length of the steps refers to a length perpendicular to a moving direction of the steps of the escalator, and the vertical length of the steps refers to a length parallel to the moving direction of the steps of the escalator and shorter than the horizontal length. That is, the steps of the escalator are implemented in a rectangular shape, and the horizontal length of the steps refers to a length of a longer side, among the longer side and a shorter side, of the rectangle forming the steps, and the vertical length of the steps is a length of the shorter side, among the longer side and the shorter side, of the rectangle forming the steps. It is assumed that the horizontal and vertical lengths of the steps are all the same and refer to the horizontal and vertical lengths in a state in which the steps are exposed to the outside of the escalator.

It is assumed that the horizontal length of the steps is longer than at least one of the first length and the second length of the robot 100. This is because it may be difficult to board the escalator when both the first length and the second length of the robot 100 are longer than the horizontal length of the steps.

The information on the height of the steps may include information on a height difference between adjacent steps, among the steps of the escalator, and information on a change rate of the height difference.

The processor 150 may acquire image data of the escalator through at least one sensor 130. The term of image data is used as a generic term for data on a structure of an escalator and the size of steps. For example, the image data may include image data of an escalator acquired through an image sensor and point cloud information acquired through a 3D lidar sensor, and any other information on the structure of the escalator and the size of steps may be included in the image data. According to embodiments, various types of data other than image data may also be used.

The processor 150 may acquire second information on the size of the plurality of steps included in the escalator based on the image data. The processor 150 may not only acquire the second information by performing a processing and calculation process according to a predefined algorithm on the image data, but also acquire the second information through a neural network model trained to acquire the second information when the image data is input.

Based on the first information and the second information, the processor 150 may identify a boarding position at which the robot 100 may board among a plurality of steps and a posture of the robot 100 for boarding at the boarding position.

Specifically, if at least one of the first length and the second length of the robot 100 is shorter than the vertical length of the steps, the processor 150 may identify a first position on a first step among the plurality of steps as the boarding position. That is, when at least one of the first length and the second length of the robot 100 is shorter than the vertical length of the steps, it may be a case in which the robot 100 may board one step, so the processor 150 may identify the first position on the first step, among the plurality of steps, as the boarding position.

The first step may be a step appearing first based on an approach of the escalator when the robot 100 boards the escalator, or may be a second step. A process of identifying the first step, among the plurality of steps, may be performed based on a distance between the robot 100 and the escalator, a moving speed of the robot 100, and the like. Also, the first position on the first step may be determined as an certain region including the center of gravity of a plane (rectangle) of the first step, or may be determined based on a position of an object when the object exists on the first step as will be described later.

When the first length of the robot 100 is shorter than the vertical length of the steps, the second length of the robot 100 defined as being shorter than the first length is also shorter than the vertical length of the steps, so the posture of the robot 100 does not matter. However, when the first length of the robot 100 is longer than the vertical length of the steps and the second length of the robot 100 is shorter than the vertical length of the steps, it is necessary to identify the posture of the robot 100 for stably boarding at the first step.

Specifically, when the first length of the robot 100 is shorter than the vertical length of the steps, the processor 150 may control the plurality of motors 120 so that the robot 100 boards the first position in a posture in which a direction corresponding to the first length of the robot 100 is parallel to a direction corresponding to the vertical length of the steps. When the first length of the robot 100 is longer than the vertical length of the steps and the second length of the robot 100 is shorter than the vertical length of the steps, the processor 150 may control the plurality of motors 120 so that the robot 100 boards the first position in a posture in which a direction corresponding to the first length of the robot 100 is parallel to a direction corresponding to the horizontal length of the steps. A method of boarding at, while changing the posture of the robot 100, may vary depending on the structure and shape of the robot 100, and an embodiment thereof will be described in detail with reference to FIGS. 4 and 5.

When the first and second lengths of the robot 100 are longer than the vertical length of the steps, the processor 150 may identify the first step, among the plurality of steps, and a second position on the second step adjacent to the first step, as the boarding position. That is, when the first length and the second length of the robot 100 are longer than the vertical length of the steps, it may be a case in which the robot 100 cannot board one step, and thus, the processor 150 may control the robot 100 to board using the second step adjacent to the first step, along with the first step, among the plurality of steps.

When the first step is a step that appears first based on the approach of the escalator when the robot 100 is to board the escalator, the second step may be a step that appears after the first step or may be a step that appears before the first step. Further, the positions on the first and second steps may be determined as certain regions including the center of gravity of a region including a plane of the first step and a plane of the second step, and may be determined based on a position of an object when the object exists on the first step and/or the second step.

When the first length of the robot 100 is shorter than twice the vertical length of the steps, the posture of the robot 100 for boarding at the first step and the second position on second step does not matter. However, when the first length of the robot 100 is longer than twice the vertical length of the steps and the second length of the robot 100 is shorter than twice the vertical length of the steps, it is necessary to identify the posture of the robot 100 for stable stably boarding at the first step and the second position of the second step.

Specifically, if the first length of the robot 100 is shorter than twice the vertical length of the steps, the processor 150 may control the plurality of motors 120 so that the robot 100 boards the second position in a posture in which a direction corresponding to the first length of the robot 100 is parallel to a direction corresponding to the vertical length of the steps. If the first length of the robot 100 is longer than twice the vertical length of the steps and the second length of the robot 100 is shorter than twice the vertical length of the steps, the processor 150 may control the plurality of motors 120 so that the robot may board the second position in a posture in which a direction corresponding to the first length of the robot 100 is parallel to a direction corresponding to the horizontal length of the steps.

As described above, a method of changing the posture of the robot 100 by rotating the direction corresponding to the first length of the robot 100 when the robot 100 boards the first step and the second position on second step is described, and this is based on the assumption that the height of the plurality of wheels 110 may be adjusted in the changed posture of the robot 100 as will be described later. That is, the above method of changing the posture of the robot 100 when the robot 100 boards the first step and the second position on the second step may be based on the assumption that a height of the wheel disposed on the first step and a height of the wheel disposed on the second step may be adjusted to be different when the robot 100 boards the first step and the second position of the second step.

While the height difference between the first step and the second step is changed, the processor 150 may control the plurality of motors 120 so that a height difference between the plurality of wheels 110 corresponds to a height difference between the first step and the second step. Specifically, the processor 150 may cause the robot to stably board by adaptively adjusting a height of at least one of the plurality of wheels 110 so that a height difference between the plurality of wheels 110 corresponds to the height difference between the first step and the second step based on information on a height difference between adjacent steps, among the steps of the escalator, and a change rate of the height difference.

Adjusting the height difference between the plurality of wheels 110 to correspond to the height difference between the first step and the second step may include a meaning that the height difference between the first step and the second step and the height difference between the plurality of wheels 110 are maintained within a range in which the robot 100 does not fall from the escalator, as well as a case in which the height difference between the first step and the second step and the height difference between the plurality of wheels 110 are accurately identical.

When at least one sensor 130 includes a balance sensor, such as a gyroscope or an acceleration sensor, the processor 150 may acquire a sensing value indicating whether the robot 100 is balanced through the balance sensor, and control the plurality of motors 120 so that a height difference between the plurality of wheels 110 corresponds to the height difference between the first step and the second step based on the acquired sensing value.

In the above, the robot 100 has been described on the premise that the robot 100 may board the first step and the second position on the second step, but the robot 100 boards using a third step adjacent to the first step or the second step, together with the first step and the second step. Specifically, when the first length or the second length of the robot 100 is shorter than twice the vertical length of the steps, the processor 150 may identify the first step and the second position on the second step as a boarding position, but when the first length or the second length of the robot is longer than twice the vertical length of the steps, the processor 150 may identify the first step, the second step, and a third position on the third step, as a boarding position. As described above, the number of steps for boarding may be determined based on the first length and the second length of the robot 100 or may be determined based on a distance between a left wheel and a right wheel, among the plurality of wheels 110 of the robot 100.

When the boarding position and posture of the robot 100 are identified, the processor 150 may acquire control information for controlling the robot 100 to board at the identified boarding position and in the identified posture. Also, the processor 150 may control the plurality of motors 120 based on the acquired control information.

Specifically, the processor 150 may identify a movement path for moving the robot 100 from a current position of the robot 100 to the identified boarding position, and acquire control information for moving the robot 100 to the movement path. Also, the processor 150 may acquire control information for controlling the robot 100 to take the identified posture at the boarding position. In particular, the control information for changing the posture of the robot 100 may include information for changing a direction in which the front of the robot 100 faces, information for adjusting the height of at least one of the plurality of wheels 110, and the like. The processor 150 may cause the robot 100 to board at the identified boarding position in the identified posture by controlling the plurality of motors 120 based on the control information described above.

When an object (e.g., a person, animal, another robot 100, etc.) exists at the identified boarding position or the movement path to the boarding position, it is necessary to acquire control information in consideration of the presence of the object. Therefore, the processor 150 may acquire information on objects around the escalator through the at least one sensor 130, and identify the boarding position and a movement path to the boarding position from the current position of the robot 100 based on the first information, the second information, and the object.

In addition, when an object around the escalator is identified, the processor 150 may control the robot 100 to wait at the current position until it is identified that no object exists within a predetermined critical distance around the escalator. For example, when there is another object on the escalator that has got on before the robot 100, the processor 150 may control the robot 100 to board the escalator after a distance between the object and the robot 100 is equal to or greater than a critical distance (that is, after a safe distance is secured).

In the above, an embodiment in which the robot 100 boards two or more steps, among the plurality of steps, has been described, but this is based on the assumption that the robot 100 stably boards by adjusting the height of the plurality of wheels 110. That is, when a maximum height adjustment value of the wheel is smaller than a height difference between adjacent steps or when a maximum rate of the height adjustment of the wheel is slower than a change rate of the height difference between steps based on the first information and the second information, it may be difficult for the robot 100 to stably board the escalator, and thus, the processor 150 may determine that the robot 100 should not board the escalator. When the robot 100 is determined not to board the escalator, the processor 150 may identify another movement path that does not go through the escalator, and controls the robot 100 to reach a destination through the identified other path.

Only a case in which the robot 100 boards the escalator will be described as an example, but various embodiments may be similarly applied not only to the case of boarding at but also to the case of getting off. In performing the operation of getting off, rotation in a direction opposite to the direction of rotation at the time of boarding at and height adjustment in a direction opposite to the direction of height adjustment at the time of boarding at may be performed.

Specifically, when a height difference between a get-on step and a preceding step is less than a predetermined threshold value through a ground observation sensor, the processor 150 may control the plurality of motors 120 so that the robot 100 may perform an operation of getting off. Performing of the operation of getting off is not limited to performing the operation of getting off of the robot 100 as soon as the height difference between the get-on step and the preceding step is less than the predetermined threshold value and may include a meaning of performing the operation of getting off after a predetermined time. In addition, the processor 150 may perform the operation of getting off of the robot 100 based on the detection of ground expansion at the same height as that of an upper surface of the get-on step, and may perform the operation of getting off of the robot 100 based on identifying of a reduction in the height difference between the plurality of wheels 110.

Figure 8:
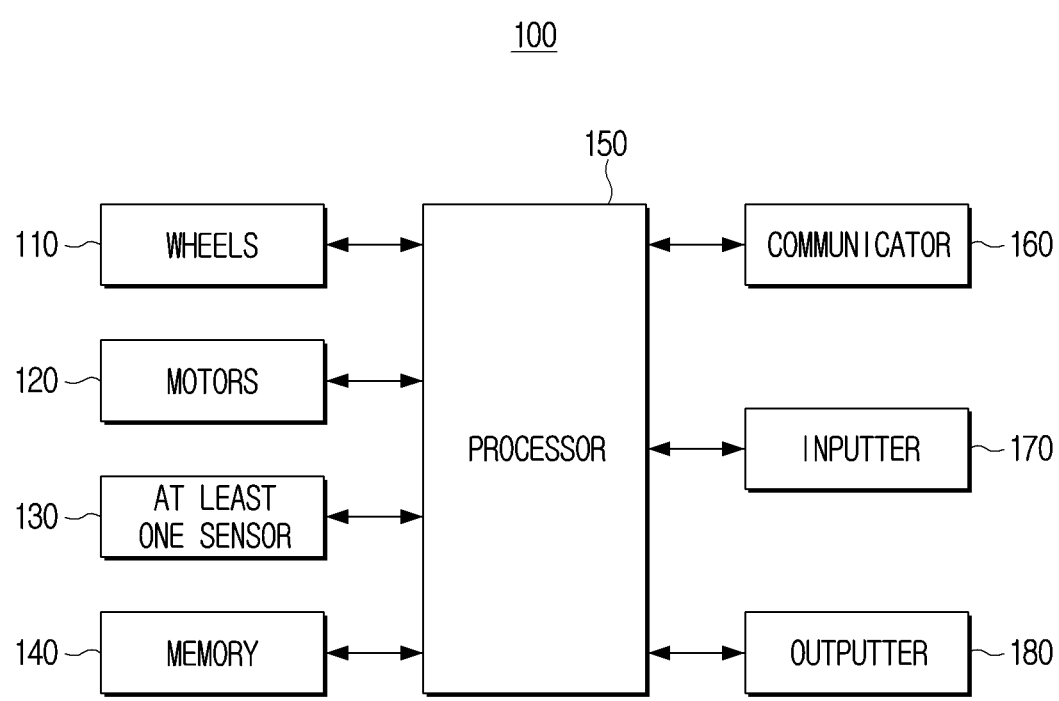
FIG. 8 is a diagram specifically illustrating a configuration of a robot according to one or more embodiments of the disclosure.

When an object is identified to exist within a critical distance while the robot 100 is performing the operation of getting off, the processor 150 may output a voice warning and/or gesture warning to the object through an outputter 180 (in FIG. 8). When an object is identified to exist within a critical distance while the robot 100 is performing the operation of getting off, the processor 150 may control the plurality of motors 120 so that the robot 100 may move backward at the same speed as a moving speed of the escalator and in a direction opposite to the moving direction of the escalator to maintain the position thereof.

When a predetermined emergency situation is identified when the robot 100 boards or unboards, the processor 150 may control a communicator 160 to transmit a request for emergency stop to an escalator management server, so that the escalator may be urgently stopped.

According to the various embodiments described above, the robot 100 may identify a preferred boarding position on the escalator and a posture of the robot 100 and control the robot 100 to stably board/unboard the escalator based thereon.

In particular, when it is not possible for the robot 100 to board forwardly, the robot 100 may rotate the body thereof to board the escalator, and may stably board using two or more steps of the escalator by adaptively controlling the height of the plurality of wheels 110 according to a change rate of the height difference between adjacent steps. As a result, the robot 100 may adopt a path using the escalator as a movement path instead of another path, and thus driving efficiency of the robot 100 may be remarkably improved.

Figure 4:
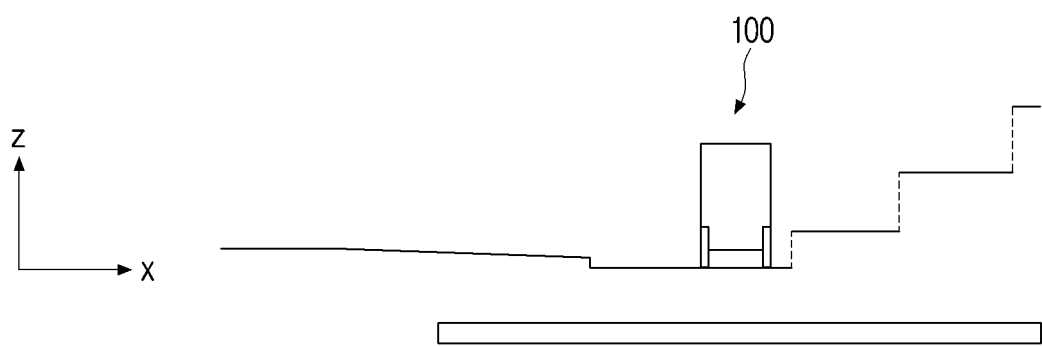
FIG. 4 is a diagram specifically illustrating an escalator boarding process of a robot according to one or more embodiments of the disclosure.
Figure 5:
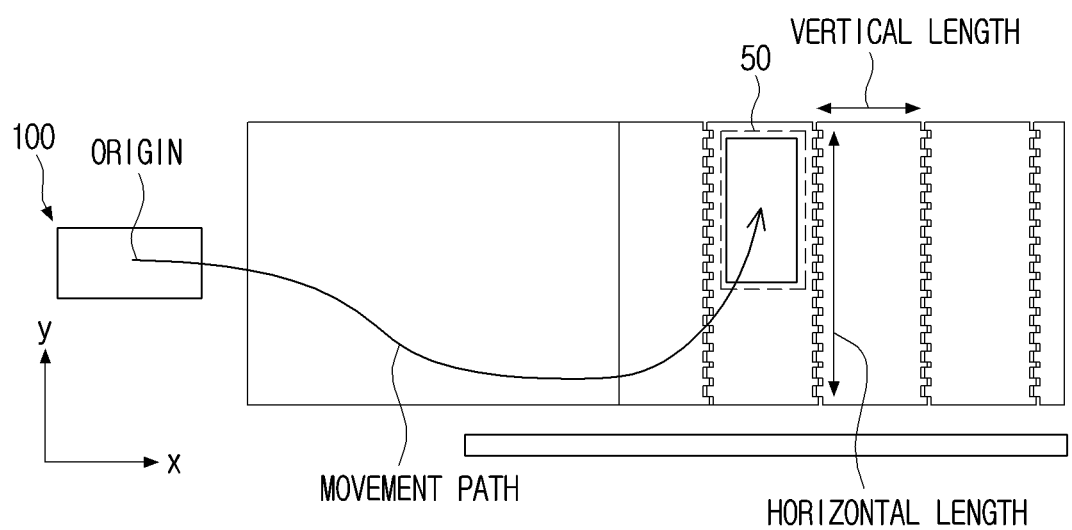
FIG. 5 is a diagram specifically illustrating an escalator boarding process of a robot according to one or more embodiments of the disclosure.

FIGS. 4 and 5 are diagrams specifically illustrating an escalator boarding process of the robot 100 according to one or more embodiments of the disclosure.

In FIGS. 4 and 5, the x-axis corresponds to a moving direction of the escalator, the y-axis corresponds to a direction parallel to the ground and perpendicular to the moving direction of the escalator, and the z-axis corresponds to a direction perpendicular to the ground. That is, FIG. 4 is a diagram illustrating the robot 100 on the escalator as viewed from the side of the escalator, and FIG. 5 is a diagram illustrating an operation of the robot 100 until the robot boards the escalator as viewed from the top of the escalator.

In the description of FIGS. 4 and 5, as a case in which the robot 100 is implemented in the shape shown in FIG. 2 and includes two wheels, the case will be described on the premise that the robot 100 includes two wheels and a rotating shaft as the center of rotation when the two wheels rotate for the movement of the robot 100 is parallel to a direction of the second length. In addition, the following will be described on the premise that a length of the side having the maximum width in the body of the robot 100 is the first length, and a length of the side having the minimum width in the body of the robot 100 is the second length.

As shown in FIG. 5, the robot 100 may be located at an origin, and the origin refers to a position suitable for acquiring image data of the escalator through at least one sensor 130. The processor 150 may identify the origin, which is a position suitable for acquiring image data on the escalator, based on the image data of the escalator acquired before the robot 100 arrives at the origin. In addition, the origin may be determined according to a developer's or user's setting.

FIG. 5 illustrates a boarding process of the robot 100 when the first length of the robot 100 is longer than the vertical length of the steps and the second length of the robot 100 is shorter than the vertical length of the steps.

As described above, when at least one of the first length and the second length of the robot 100 is shorter than the vertical length of the steps, the processor 150 may identify the first position on the first step, among the plurality of steps, as a boarding position. That is, when at least one of the first length and the second length of the robot 100 is shorter than the vertical length of the steps, it may be a case in which the robot 100 may board one step, so the processor 150 may identify the first position on the first step, among a plurality of steps, as the boarding position. For example, in the example according to FIGS. 4 and 5, a region 50 of FIG. 5 may be identified as the first position.

As described above, when the first length of the robot 100 is longer than the vertical length of the steps and the second length of the robot 100 is shorter than the vertical length of the steps, it is necessary to identify a posture of the robot 100 to stably board the first step. Accordingly, the processor 150 may identify a posture in which a direction corresponding to the first length of the robot 100 is parallel to a direction corresponding to the horizontal length of the steps, as a posture of the robot 100 to board the first position. For example, in the example according to FIGS. 4 and 5, a posture in which the direction corresponding to the first length of the robot 100 (i.e., the direction corresponding to the front of the robot 100 in the example of FIGS. 4 and 5) is rotated by 90 degrees in a counterclockwise direction, may be identified as a posture at the first position.

In the above, the process of identifying the boarding position of the robot 100 and the process of identifying the posture of the robot 100 have been described, but there is no restriction in the order thereamong, and the processor 150 may identify the boarding position of the robot 100 and the posture of the robot 100 by collectively considering the first information and the second information.

The processor 150 may identify a movement path for moving the robot 100 from the current position (i.e., the origin of FIG. 5) of the robot 100 to the boarding position, and acquire control information for moving the robot 100 to the movement path. For example, the movement path shown in FIG. 5 may be determined based on the fact that the first position is determined as the area 50 of FIG. 5 and the robot 100 rotates in the direction corresponding to the first length by 90 degrees in the counterclockwise direction. That is, when the robot 100 rotates in the counterclockwise direction to board the region 50 of FIG. 5, the movement path of the robot 100 may be determined to pass through the right side rather than the center of the escalator. In other words, when the boarding position and posture of the robot 100 are identified, the processor 150 may determine the movement path of the robot 100 by collectively considering the boarding position and posture of the robot 100.

Figure 6:
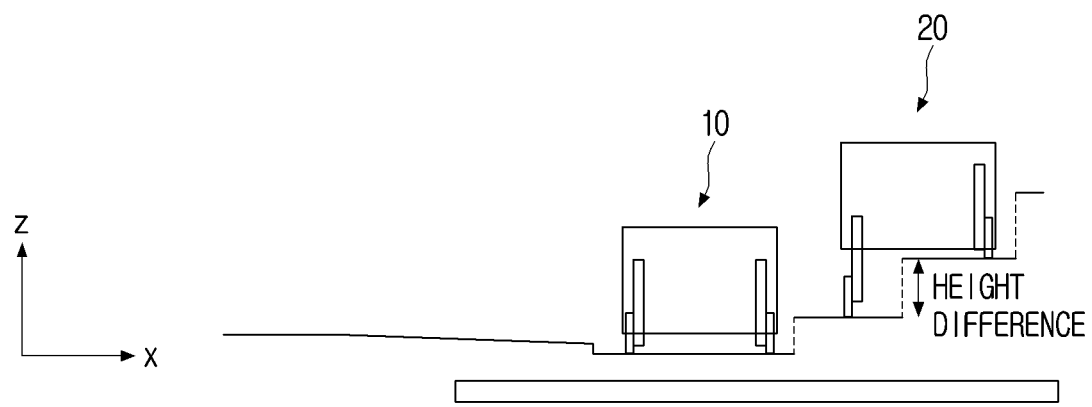
FIG. 6 is a diagram specifically illustrating an escalator boarding process of a robot according to one or more embodiments of the disclosure.
Figure 7:
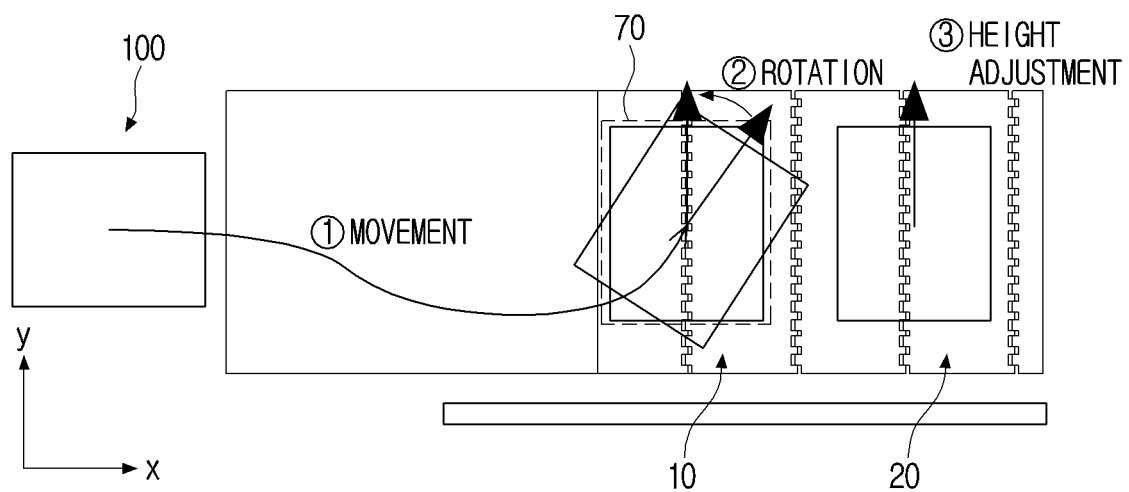
FIG. 7 is a diagram specifically illustrating an escalator boarding process of a robot according to one or more embodiments of the disclosure.

FIGS. 6 and 7 are diagrams specifically illustrating an escalator boarding process of the robot 100 according to one or more embodiments of the disclosure.

As in the case of FIGS. 4 and 5, in FIGS. 6 and 7, the x-axis corresponds to the moving direction the escalator, the y-axis is parallel to the ground and corresponds to the direction perpendicular to the moving direction of the escalator, and the z-axis corresponds to the direction perpendicular to the ground. That is, FIG. 6 is a diagram illustrating the robot 100 got on the escalator as viewed from the side of the escalator, and FIG. 7 is a diagram illustrating the operation of the robot 100 until the robot 100 boards at the boarding position as viewed from the top of the escalator.

As in the case of FIGS. 4 and 5, in the description of FIGS. 6 and 7, as a case in which the robot 100 is implemented in the shape shown in FIG. 2 and includes two wheels, the case will be described on the premise that the robot 100 includes two wheels and a rotating shaft as the center of rotation when the two wheels rotate for the movement of the robot 100 is parallel to a direction of the second length. In addition, the following will be described on the premise that a length of the side having the maximum width in the body of the robot 100 is the first length, and a length of the side having the minimum width in the body of the robot 100 is the second length.

FIG. 7 shows a process in which the robot 100 boards when the first length and the second length of the robot 100 are longer than the vertical lengths of the steps and the first length of the robot 100 is longer than twice the vertical length of the steps and the second length of the robot 100 is shorter than twice the vertical length of the steps.

As described above, when the first and second lengths of the robot 100 are longer than the vertical length of the steps, the processor 150 may identify the first step, among the plurality of steps, and the second position on the second step adjacent to the first step, as a boarding position. That is, when the first length and the second length of the robot 100 are longer than the vertical length of the steps, it may be a case in which the robot 100 cannot board a step, and thus, the processor 150 may cause board the robot 100 using the first step, among the plurality of steps, and the second step adjacent to the first step. For example, in the example according to FIGS. 6 and 7, the region 70 of FIG. 7 may be identified as the second position.

As described above, when the first length of the robot 100 is longer than twice the vertical length of the steps and the second length of the robot 100 is shorter than twice the vertical length of the steps, it may be necessary to identify a posture of the robot 100 to stably board the first step and the second position on the second step. Therefore, the processor 150 may identify a posture in which a direction corresponding to the first length of the robot 100 is parallel to a direction corresponding to the horizontal length of the steps, as a posture of the robot 100 to board the second position. For example, in the examples of FIGS. 6 and 7, a posture in which a direction corresponding to the first length of the robot 100 rotates by 90 degrees in the counterclockwise direction, may be identified as a posture in the second position.

When the boarding position and the posture are identified, the processor 150 may control the robot 100 to board the identified boarding position in the identified posture, and a corresponding control process may include 1) a movement process, 2) a rotation process, and 3) a height adjustment process as shown in FIG. 7. The robot 100 located at the origin in FIG. 7, a robot 10 performing a rotation process, and a robot 20 performing height adjustment are not different from each other, but the same at the positions and postures of the robot 100 at different times. The movement process and the rotation process of the robot 100 have been described in detail in the embodiment of FIGS. 4 and 5, and thus, the height adjustment process will be described below.

The robot 100 moves along the movement path of FIG. 7 to board the first step (the first step based on the left in FIG. 7) and the second position on the second step (the second step based on the left in FIG. 7) of the escalator, and when the direction corresponding to the first length of the robot 100 rotates by 90 degrees in the counterclockwise direction, the first step and the second step move to a position corresponding to a third step and a fourth step based on the left in FIG. 7. Accordingly, a height difference is made between the first step and the second step. In this case, if the height difference between the left wheel of the robot 100 located on the first step and the right wheel of the robot 100 located on the second step is not adjusted, the robot 100 may fall to the back based on the moving direction of the escalator.

Therefore, while the height difference between the first step and the second step changes, the processor 150 may control the plurality of motors 120 so that a height difference between the plurality of wheels 110 corresponds to the height difference between the first step and the second step. Specifically, the processor 150 may adaptively adjust the height of at least one of the plurality of wheels 110 so that the height difference between the plurality of wheels 110 corresponds to the height difference between the first step and the second step based on the information on the height difference between the adjacent steps, among the steps of the escalator, and a change rate of the height difference, thereby allowing the robot 100 to be stably board.

For example, in the example according to FIGS. 4 and 5, the processor 150 may control the plurality of motors 120 so that the height difference between the left wheel of the robot 100 located on the first step and the right wheel of the robot 100 located on the second step matches the height difference between the first step and the second step.

It may be desirable to consider the moving speed of a plurality of steps included in the escalator when continuously performing the movement process, rotation process, and height adjustment process of the robot 100 as described above. For example, the processor 150 may control the operation of the robot 100 so that the robot 100 moves to the step when there is little difference in height between the first and second steps of the elevator and the first step and the second step are flat or close to a plane.

In the above, it has been described on the premise that the direction corresponding to the first length and the direction corresponding to the second length of the robot 100 are perpendicular to each other, but when the direction corresponding to the first length and the direction corresponding to the second length are not perpendicular to each other according to the shape of the robot 100, a rotation operation may be performed in a manner different from that of the aforementioned embodiment according to the shape of the robot 100.

In the description of FIGS. 4 to 7, the operation of rotating the robot 100 by 90 degrees in the counterclockwise direction, while the robot 100 boards the step of the escalator, has been described, and the processor 150 may identify whether the maximum width (for example, a diagonal length of the rectangle representing a shape of the robot 100 viewed from above in FIG. 7) of the robot 100 is shorter than the horizontal length of the steps of the escalator, and perform a control process according to the embodiment described above only when the maximum width of the robot 100 is shorter than the horizontal length of the steps.

In the above, in FIGS. 4 to 7, the robot 100 has been described on the premise that the robot 100 boards an upward escalator to move to an upper floor, but the embodiments described above may also be applied to a case in which the robot 100 boards a downward escalator.

FIG. 8 is a diagram specifically illustrating the configuration of the robot 100 according to one or more embodiments of the disclosure.

As shown in FIG. 8, the robot 100 may further include the communicator 160, an inputter 170, and an outputter 180, as well as the plurality of wheels 110, the plurality of motors 120, at least one sensor 130, the memory 140, and the processor 150. However, the components shown in FIGS. 1 and 8 are merely examples, and a new component may be added in addition to the components shown in FIGS. 1 and 8 or some components may be omitted.

The communicator 160 may include a circuit and may communicate with an external device. Specifically, the processor 150 may receive various data or information from an external device connected through the communicator 160 and may transmit various data or information to the external device.

The communicator 160 may include at least one of a Wi-Fi module, a Bluetooth module, a wireless communication module, an NFC module, and an ultra wide band (UWB) module. Specifically, each of the Wi-Fi module and the Bluetooth module may perform communication using a Wi-Fi method or a Bluetooth method. In case of using the Wi-Fi module or the Bluetooth module, various connection information, such as an SSID, may be first transmitted and received, communication is connected using the connection information, and then, various information may be transmitted and received.

In addition, the wireless communication module may perform communication according to various communication standards, such as IEEE, Zigbee, 3rd Generation (3G), 3rd Generation Partnership Project (3GPP), Long Term Evolution (LTE), and 5th Generation (5G). In addition, the NFC module may perform communication using a NFC (Near Field Communication) method using a 13.56 MHz band among various RF-ID frequency bands, such as 135 kHz, 13.56 MHz, 433 MHz, 860 to 960 MHz, and 2.45 GHz. In addition, the UWB module may accurately measure time of arrival (ToA), which is a time at which a pulse arrives at a target, and angle of arrival (AoA), which is an angle of arrival of a pulse in a transmitting device, through communication between UWB antennas, and accordingly, it is possible to recognize a precise distance and position within an error range of several tens of centimeters in an indoor area.

In particular, the processor 150 may receive a user command for controlling the operation of the robot 100 from an external device through the communicator 160. The processor 150 may receive information on a position of the escalator from an external device through the communicator 160. The processor 150 may receive first information on the size of the robot 100, image data regarding the escalator, or second information on the size of a plurality of steps from an external device through the communicator 160. Also, the processor 150 may control the communicator 160 to transmit the first information and the second information to an external device.

If a predetermined emergency situation is identified when the robot 100 boards or unboards, the processor 150 may control the communicator 160 to transmit a request for emergency stop to an escalator management server, so that the escalator may be urgently stopped.

The inputter 170 may include a circuit, and the processor 150 may receive a user command for controlling the operation of the robot 100 through the inputter 170. Specifically, the inputter 170 may include components, such as a microphone, a camera (not shown), and a remote control signal receiver (not shown). Also, the inputter 170 may be implemented as a touch screen included in a display. In particular, the microphone may receive a voice signal and convert the received voice signal into an electrical signal.

In particular, the processor 150 may acquire a user command for controlling the operation of the robot 100 through the inputter 170. The user command may be a user command for the robot 100 to board the escalator, a user command for the robot 100 to move to a specific destination, or a user command for causing the robot 100 to perform a specific task. That is, the escalator boarding process may be performed based on a user command for causing the robot 100 to move to a specific destination or a user command for causing the robot 100 to perform a specific task.

The outputter 180 may include a circuit, and the processor 150 may output various functions that the robot 100 may perform through the outputter 180. Also, the outputter 180 may include at least one of a display, a speaker, and an indicator.

The display may output image data under the control of the processor 150. Specifically, the display may output an image pre-stored in the memory 140 under the control of the processor 150. In particular, the display may display a user interface stored in the memory 140. The display may be implemented as a liquid crystal display (LCD) panel, organic light emitting diodes (OLED), or the like, and the display may also be implemented as a flexible display, a transparent display, or the like, depending on circumstances. However, the display is not limited to a specific type. The speaker may output audio data under the control of the processor 150, and the indicator may be turned on under the control of the processor 150.

In particular, the processor 150 may output a guide message indicating that the robot 100 has completed boarding the escalator through the outputter 180. Also, the processor 150 may output a guide message indicating that the robot 100 cannot board the escalator through the outputter 180. The guide message indicating that the robot 100 cannot board the escalator may include information on a new path not using the escalator.

FIG. 9 is a flowchart illustrating a controlling method of the robot 100 according to one or more embodiments of the disclosure.

As shown in FIG. 9, the robot 100 may acquire first information on a size of the robot 100 (S910). Specifically, the first information may be stored in a memory by a developer when the robot 100 is manufactured or may be received from an external device and stored in the memory.

The robot 100 may acquire image data of the escalator through at least one sensor (S920). Any information related to a structure of the escalator and a size of the steps may be included in the image data, and various data other than the form of image data may also be used.

The robot 100 may acquire second information on the size of the plurality of steps included in the escalator based on the image data (S930). Also, the robot 100 may identify a boarding position in which the robot 100 may board among the plurality of steps based on the first information and the second information and a posture of the robot 100 for boarding at the boarding position (S940).

When at least one of the first length and the second length of the robot 100 is shorter than the vertical length of the steps, the robot 100 may identify a first position on the first step, among the plurality of steps, as a boarding position.

If the first length of the robot 100 is shorter than the vertical length of the steps, the robot 100 may control the plurality of motors so that the robot 100 may board the first position in a posture in which a direction corresponding to the first length of the robot 100 is parallel to a direction corresponding to the vertical length of the steps. When the first length of the robot 100 is longer than the vertical length of the steps and the second length of the robot 100 is shorter than the vertical length of the steps, the robot 100 may control the plurality of motors so that the robot 100 boards the first position in a posture in which a direction corresponding to the first length of the robot 100 is parallel to a direction corresponding to the horizontal length of the steps.

When the first and second lengths of the robot 100 are longer than the vertical length of the steps, the processor may identify the first step, among the plurality of steps, and a second position on the second step adjacent to the first step, as the boarding position.

If the first length of the robot 100 is shorter than twice the vertical length of the steps, the robot 100 may control the plurality of motors so that the robot 100 boards the second position in a posture in which a direction corresponding to the first length of the robot 100 is parallel to a direction corresponding to the vertical length of the steps. If the first length of the robot 100 is longer than twice the vertical length of the steps and the second length of the robot 100 is shorter than twice the vertical length of the steps, the robot 100 may control the plurality of motors so that the robot may board the second position in a posture in which a direction corresponding to the first length of the robot 100 is parallel to a direction corresponding to the horizontal length of the steps.

While the height difference between the first step and the second step is changed, the robot 100 may control the plurality of motors so that a height difference between the plurality of wheels corresponds to a height difference between the first step and the second step. Specifically, the robot 100 may cause the robot to stably board by adaptively adjusting a height of at least one of the plurality of wheels so that a height difference between the plurality of wheels corresponds to the height difference between the first step and the second step based on information on a height difference between adjacent steps, among the steps of the escalator, and a change rate of the height difference.

When the boarding position and posture of the robot 100 are identified, the robot 100 may acquire control information for controlling the robot 100 to board at the identified boarding position in the identified posture (S950). Also, the robot 100 may control the plurality of motors based on the acquired control information (S960).

Specifically, the robot 100 may identify a movement path for moving the robot 100 from a current position of the robot 100 to the identified boarding position, and acquire control information for moving the robot 100 to the movement path. Also, the robot 100 may acquire control information for controlling the robot 100 to take the identified posture at the boarding position. In particular, the control information for changing the posture of the robot 100 may include information for changing a direction in which the front of the robot 100 faces, information for adjusting the height of at least one of the plurality of wheels, and the like. The robot 100 may cause the robot 100 to board at the identified boarding position in the identified posture by controlling the plurality of motors based on the control information described above.

A controlling method of the robot 100 according to the embodiment described above may be implemented as a program and provided to the robot 100. In particular, the program including the controlling method of the robot 100 may be stored and provided in a non-transitory computer-readable medium.

Specifically, in a non-transitory computer-readable recording medium including the program executing the controlling method of the robot 100, the controlling method of the robot 100 may include acquiring first information on a size of the robot 100, acquiring image data of an escalator through at least one sensor, acquiring second information on a size of a plurality of steps included in the escalator based on the image data, identifying a boarding position in which the robot 100 may board, among a plurality of steps, based on the first information and the second information and a posture of the robot 100 to board at the boarding position, acquiring control information for controlling the robot 100 to board the identified position in the identified posture when the boarding position and the posture are identified, and controlling a plurality of motors based on the control information.

In the above, the controlling method of the robot 100 and the computer-readable recording medium including the program for executing the controlling method of the robot 100 have been briefly described, but this is only for omitting redundant description, and various embodiments of the robot 100 may be applied to the controlling method of the robot 100 and the computer-readable recording medium including the program for executing the controlling method of the robot 100.

According to the various embodiments described above, the robot 100 may identify a desirable boarding position on the escalator and a posture of the robot 100, and control the robot 100 to stably board the escalator based thereon.

In particular, when it is not possible for the robot 100 to board forwardly, the robot 100 may rotate the body thereof to board the escalator, and may stably board using two or more steps of the escalator by adaptively controlling the height of the plurality of wheels according to a change rate of the height difference between adjacent steps. As a result, the robot 100 may adopt a path using the escalator as a movement path instead of another path, and thus driving efficiency of the robot 100 may be remarkably improved.

The functions related to the above may be performed through a memory and a processor.

The processor may be configured as one or a plurality of processors. In this case, one or the plurality of processors may be general-purpose processors, such as CPUs and APs, graphics-only processors, such as GPUs and VPUs, or AI-only processors, such as NPUs.

The one or a plurality of processors control to process input data according to a predefined operation rule or AI model stored in a non-volatile memory or a volatile memory. The predefined operation rule or AI model is made through learning (training)

Being made through learning may refer, for example, to a predefined operation rule or AI model having desired characteristics being made by applying a learning algorithm to a plurality of learning data. Such learning may be performed in a device itself in which the AI is performed, or may be performed through a separate server/system.

The AI model may be configured with a plurality of neural network layers. Each layer has a plurality of weight values, and a layer operation is performed through a calculation result of a previous layer and an operation between the plurality of weights. Examples of neural networks include Convolutional Neural Network (CNN), Deep Neural Network (DNN), Recurrent Neural Network (RNN), Restricted Boltzmann Machine (RBM), Deep Belief Network (DEN), Bidirectional Recurrent Deep Neural Network (BRDNN), Generative Adversarial Networks (GAN), and Deep Q-Networks, which are not limited to the above examples, unless otherwise specified.

The learning algorithm may refer, for example, to a method of training a predetermined target device (e.g., a robot 100) using a plurality of learning data so that the predetermined target device may make a decision or make a prediction by itself. Examples of the learning algorithm include supervised learning, unsupervised learning, semi-supervised learning, or reinforcement learning, and the learning algorithm is not limited to the examples mentioned above, except for a specified case.

The device-readable storage medium may be provided in the form of a non-transitory storage medium. 'Non-temporary storage medium' only means that it is a tangible device and does not contain signals (e.g., electromagnetic waves). This term does not distinguish between a case in which data is stored semi-permanently in a storage medium and a case in which data is stored temporarily. For example, a 'non-temporary storage medium' may include a buffer in which data is temporarily stored.

According to one or more embodiments, a method may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product (e.g., a downloadable app) may be temporarily generated or at least temporarily stored in the machine-readable storage medium, such as memory of the manufacturer's server, a server of the application store, or a relay server.

According to various embodiments, each component (e.g., a module or a program) of the aforementioned components may include a single entity or multiple entities. According to various embodiments, one or more of the aforementioned components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration.

According to various embodiments, operations performed by the module, the program, or another component may be carried out sequentially, in parallel, repeatedly, or heuristically, or one or more of the operations may be executed in a different order or omitted, or one or more other operations may be added.

The term "part" or "module" used herein may represent, for example, a unit including one or more combinations of hardware, software and firmware, and may be interchangeably used with the terms "logic", "logical block", "component" and "circuit". The "part" or "module" may be a minimum unit of an integrated part or may be a part thereof. The "module" may be a minimum unit for performing one or more functions or a part thereof. For example, the "module" may include an application-specific integrated circuit (ASIC).

Various embodiments may be implemented by software including an instruction stored in a machine-readable storage medium readable by a machine (e.g., a computer). The machine may be a device that calls the instruction from the machine-readable storage media and operates depending on the called instruction and may include the electronic device (e.g., the robot 100).

When the instruction is executed by the processor, the processor may perform a function corresponding to the instruction directly or using other components under the control of the processor. The instruction may include a code generated or executed by a compiler or an interpreter.

In the above, preferred embodiments have been illustrated and described, but the disclosure is not limited to the specific embodiments described above, and those of ordinary skill in the art pertaining to the disclosure without departing from the gist of the claims. Various modifications are possible by the disclosure, of course, and these modifications should not be individually understood from the technical spirit or perspective of the disclosure.

What is claimed is:
1. A robot comprising:
a plurality of wheels;
a plurality of motors configured to drive the plurality of wheels;
at least one sensor;

a memory configured to store first information on a size of the robot; and a processor configured to:
acquire image data of an escalator from the at least one sensor, acquire second information on a size of a plurality of steps included in the escalator based on the image data, based on the first information and the second information, identify both a boarding position available for the robot to board the escalator among the plurality of steps, and a posture of the robot configured to allow the robot to board at the boarding position, acquire control information for controlling the robot to board at the boarding position in the posture when the boarding position and the posture have been identified, and control the plurality of motors based on the control information.

2. The robot as claimed in claim 1, wherein the first information includes information on a first length corresponding to a first width of the robot, information on a second length corresponding to a second width of the robot, and information on height adjustment of the plurality of wheels, the second length being shorter than the first length.

3. The robot as claimed in claim 2,
wherein the second information includes information on a horizontal length of each of the plurality of steps that is perpendicular to a non-elevating component of a moving direction of the plurality of steps, information on a vertical length of each of the plurality of steps that is parallel to the non-elevating component of the moving direction, and information on a height of the plurality of steps, the horizontal length being longer than at least one of the first length or the second length, the vertical length being shorter than the horizontal length, and wherein the information on the height of the plurality of steps includes information on a height difference between adjacent steps of the plurality steps and information on a change rate of the height difference.

4. The robot as claimed in claim 3, wherein the processor is further configured to identify a first position on a first step of the plurality of steps as the boarding position when at least one of the first length or the second length is shorter than the vertical length.

5. The robot as claimed in claim 4,
wherein, when the first length is shorter than the vertical length, the processor is configured to control the plurality of motors so that the robot boards the first position in the posture such that the first length is parallel to the vertical length, and wherein, when the first length is longer than the vertical length and the second length is shorter than the vertical length, the processor is configured to control the plurality of motors so that the robot boards the first position in the posture such that the first length is parallel to the horizontal length.

6. The robot as claimed in claim 3, wherein, when the first length and the second length are longer than the vertical length, the processor is configured to identify, as the boarding position, a second position overlapping between a first step of the plurality of steps and a second step of the plurality of steps, the second step being adjacent to the first step.

7. The robot as claimed in claim 6, wherein, when the first length is longer than the vertical length but shorter than twice the vertical length, the processor is configured to:

control the plurality of motors so that the robot boards the second position in the posture such that the first length is parallel to the vertical length, and control the plurality of motors so that a height difference between the plurality of wheels corresponds to the height difference between the first step and the second step while the height difference between the first step and the second step changes.

8. The robot as claimed in claim 6, wherein, when the first length is longer than twice the vertical length, the second length is longer than the vertical length, and the second length is shorter than twice the vertical length, the processor is configured to:

control the plurality of motors so that the robot boards the second position in the posture such that the first length is parallel to the horizontal length, and control the plurality of motors so that a height difference between the plurality of wheels corresponds to the height difference between the first step and the second step while the height difference between the first step and the second step changes.

9. The robot as claimed in claim 8,
wherein the at least one sensor comprises a balance sensor, and
wherein the processor is further configured to:
acquire a sensing value indicating whether the robot is balanced through the balance sensor, and
control the plurality of motors so that the height difference between the plurality of wheels corresponds to the height difference between the first step and the second step based on the sensing value.

10. The robot as claimed in claim 1, wherein the processor is further configured to:
acquire information on an object near the escalator through the at least one sensor, and
identify both the boarding position and a movement path based on the first information, the second information, and the information on the object, the movement path being from a current position of the robot to the boarding position.

11. A controlling method of a robot that includes a plurality of wheels, a plurality of motors for driving the plurality of wheels, and at least one sensor, the controlling method comprising:
acquiring first information on a size of the robot;
acquiring image data of an escalator from the at least one sensor;
acquiring second information on a size of a plurality of steps included in the escalator based on the image data;
based on the first information and the second information, identifying both a boarding position available for the robot to board the escalator among the plurality of steps and a posture of the robot configured to allow the robot to board at the boarding position;
acquiring control information for controlling the robot to board at the boarding position and in the posture, when the boarding position and the posture have been identified; and
controlling the plurality of motors based on the control information.

12. The controlling method as claimed in claim 11, wherein the first information includes information on a first length corresponding to a first width of the robot, information on a second length corresponding to a second width of the robot, and information on height adjustment of the plurality of wheels, the second length being shorter than the first length.

13. The controlling method as claimed in claim 12,
wherein the second information includes information on a horizontal length of each of the plurality of steps that is perpendicular to a non-elevating component of a moving direction of the plurality of steps, information on a vertical length of each of the plurality of steps that is parallel to the non-elevating component of the moving direction, and information on a height of the plurality of steps, the horizontal length being longer than at least one of the first length or the second length, the vertical length being shorter than the horizontal length, and
wherein the information on the height of the plurality of steps includes information on a height difference between adjacent steps of the plurality steps and information on a change rate of the height difference.

14. The controlling method as claimed in claim 13, wherein the identifying the boarding position comprises identifying a first position on a first step of the plurality of steps as the boarding position when at least one of the first length or the second length is shorter than the vertical length.

15. The controlling method as claimed in claim 14, wherein the controlling the plurality of motors based on the control information comprises:
when the first length is shorter than the vertical length, controlling the plurality of motors so that the robot boards the first position in the posture such that to the first length is parallel to the vertical length, and
when the first length is longer than the vertical length and the second length is shorter than the vertical length, controlling the plurality of motors so that the robot boards the first position in the posture such that the first length is parallel to the horizontal length.

16. The controlling method as claimed in claim 13, wherein the identifying the boarding position comprises identifying, as the boarding position, a second position overlapping between a first step of the plurality of steps and a second step of the plurality of steps when the first length and the second length are longer than the vertical length, the second step being adjacent to the first step.

17. The controlling method as claimed in claim 16, wherein the controlling the plurality of motors based on the control information comprises, when the first length is longer than the vertical length but shorter than twice the vertical length:
controlling the plurality of motors so that the robot boards the second position in the posture such that the first length is parallel to the vertical length, and
controlling the plurality of motors so that a height difference between the plurality of wheels corresponds to the height difference between the first step and the second step while the height difference between the first step and the second step changes.

18. The controlling method as claimed in claim 16, wherein the controlling the plurality of motors based on the control information comprises, when the first length is longer than twice the vertical length, the second length is longer than the vertical length, and the second length is shorter than twice the vertical length:
controlling the plurality of motors so that the robot boards the second position in the posture such that the first length is parallel to the horizontal length, and
controlling the plurality of motors so that a height difference between the plurality of wheels corresponds to the height difference between the first step and the second step while the height difference between the first step and the second step changes.

19. The controlling method as claimed in claim 18,
wherein the at least one sensor includes a balance sensor, and
wherein the controlling the plurality of motors based on the control information further comprises:
acquiring a sensing value indicating whether the robot is balanced through the balance sensor, and
controlling the plurality of motors so that the height difference between the plurality of wheels corresponds to the height difference between the first step and the second step based on the sensing value.

20. The controlling method as claimed in claim 11, further comprising:
acquiring information on an object near the escalator through the at least one sensor, and
identifying both the boarding position and a movement path based on the first information, the second information, and the information on the object, the movement path being from a current position of the robot to the boarding position.

* * * * *